Figure 1:
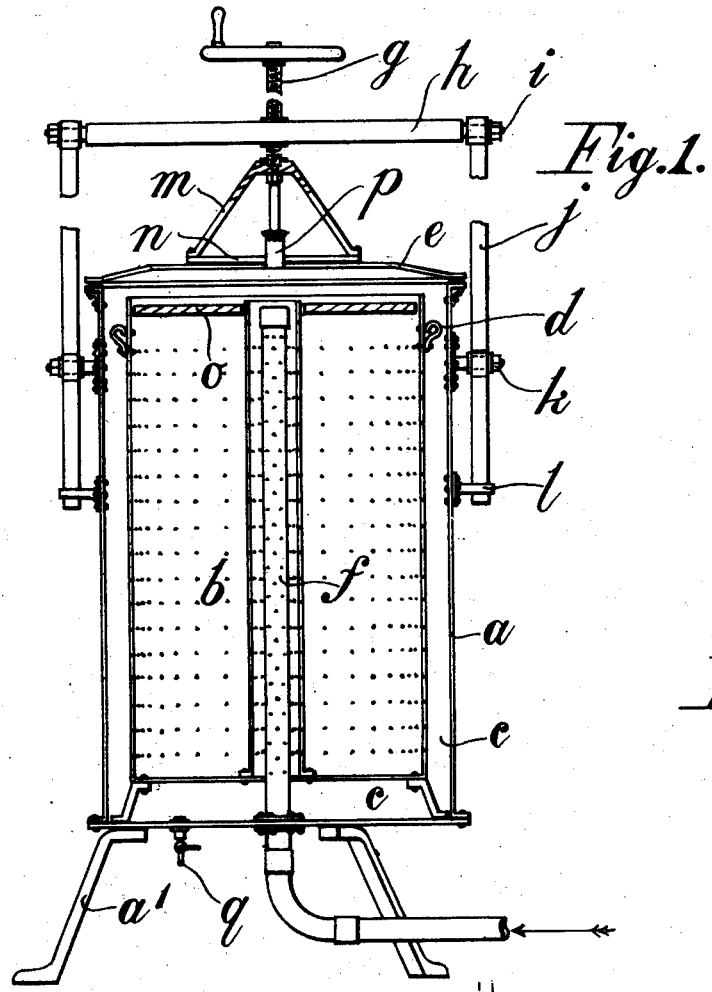

No. 883,173. PATENTED MAR. 31, 1908.
F. S. DAVIDSON & W. P. BURRA.
HOP EXTRACTING APPARATUS.
APPLICATION FILED APR. 19, 1907.

Witnesses:
H. V. Brown
Walter N. Harris

Inventors:
Francis S. Davidson
William P. Burra,
By H. H. de Vos
Attorneys

UNITED STATES PATENT OFFICE.

FRANCIS SYDNEY DAVIDSON AND WILLIAM POMFRET BURRA, OF ASHFORD, ENGLAND.

HOP-EXTRACTING APPARATUS.

No. 883,173.  Specification of Letters Patent.  Patented March 31, 1908.

Application filed April 19, 1907. Serial No. 369,176.

*To all whom it may concern:*

Be it known that we, FRANCIS SYDNEY DAVIDSON and WILLIAM POMFRET BURRA, both citizens of the United Kingdom of Great Britain and Ireland, and both residents of Ashford, Kent, England, have invented a certain new and useful Improved Hop-Extracting Apparatus, of which the following is a specification, such as will enable others skilled in the art to which it appertains to make and use the same.

Our improved apparatus is designed to obtain a better extract from hops than is possible with the boiling and other apparatus, now in use, as well as to simplify the process.

The invention also includes an improved means of compressing the hops after extraction.

In carrying out our invention we construct an outer vessel, which we call the case, of any convenient size and shape and arrange within it one or more removable perforated or openwork vessels or holders, into which the hops are placed. A space is left between the case and the holder, and suitable means such as rings or lugs are provided on the holder for lifting it out of the case. A cover of any suitable kind is fitted to the case and means are provided for closely securing it to the case. One or more steam pipes or steam inlets are arranged in or fitted to the case in such a manner that it can be quickly and evenly filled with steam generated from outside the case. The holder can be conveniently made with a central perforated tube designed to fit around a perforated steam pipe introduced through the bottom of the case, and carried up the center of it. A safety valve is fitted to the cover or other part of the apparatus and one or more draw off cocks, or their equivalents are arranged in convenient positions. The cover is preferably closed by a hand screw fitted on a bar pivoted to two side arms mounted on pins or trunnions on the outside of the case. The lower end of the hand screw carries a frame, such as a tripod or four legs to which is attached a circular metal ring which serves to press down the cover in an even and secure manner.

When the hand screw is released it can be swung away to one side with the side arms and bar, thus giving free access to the interior of the case, and allowing the holder to be raised out of it. A plate shaped to fit within the holder and to be pressed by the ring of the hand screw is provided to compress the hops when desired. The hops are placed into the holder, which is then arranged in the case and the cover fixed in position after which the supply of steam is turned on, and the apparatus is left for such time as is necessary to procure the extract. A steam pressure of about 25 lbs. and a period of about 1½ hours are all that is generally required. The steam having been shut off the cover is removed and the hops are squeezed down under the plate by the hand screw after which the holder can be lifted out and the hops emptied into the brewery copper and boiled in the usual way.

We will now describe our invention with reference to the accompanying drawings in which:—

Figure 2:
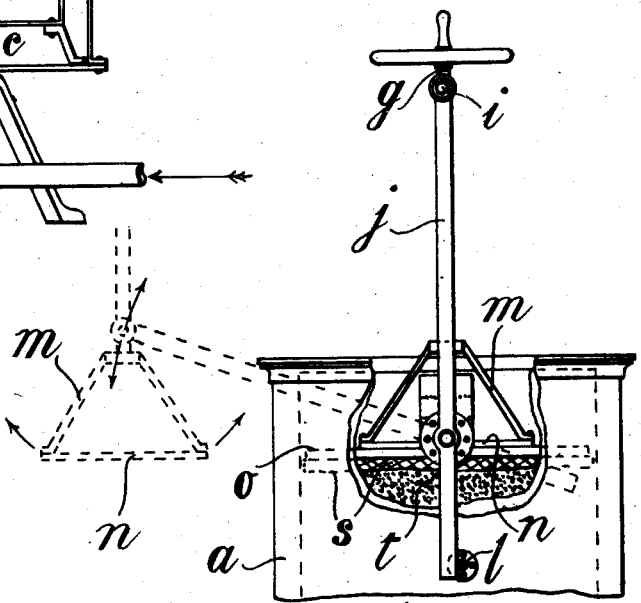

Figure 1 is a sectional elevation of an extracting apparatus, constructed according to our invention in which the cover is in position, and is shown held down by the hand screw. Fig. 2 is a view partly in section of the top of a similar apparatus and shows the cover removed and the inner plate being pressed down by the hand screw. The dotted lines indicate the position taken by the hand screw and its supports when swung to one side.

In these drawings $a$ is the outer case mounted on legs $a'$. $b$ is the perforated holder, and $c$ the space between $a$ and $b$. The holder $b$ is provided with lifting rings $d$. $e$ is the cover of the case.

A perforated steam pipe $f$ is centrally arranged in a tubular perforated passage in the holder $b$. The steam for pipe $f$ can be supplied from any convenient source. A hand wheel $g$ is mounted on bar $h$ which is pivotally attached at $i$ to the side arms $j$, which are mounted on joints or trunnions $k$ on the case. Stops $l$ serve to limit the movement in one direction of the bars $j$. Attached to the hand wheel $g$ is a frame $m$, which carries ring $n$ and serves to press down the cover $e$ or when the latter is removed the plate $o$.

$p$ and $q$ are respectively the safety valve and the draw-off cock. In Fig. 2 the hops $t$ are shown being pressed down by the plate $o$.

It must be understood that our improved extracting apparatus can be made of any suitable size and shape and that the steam can be conveyed into it through any convenient pipes or inlets. One casing can be arranged to hold several hop holders which can be removed horizontally, vertically or in any convenient way. The steam permeates thoroughly through the hops and extracting the flavor and essence condenses and falls to the bottom of the case, where it is drawn off by the tap $q$ or its equivalent.

While this apparatus is designed for use in treating hops to form an extract thereof in which the more volatile and aromatic oils are fixed in a liquid form, instead of being dissipated in the air when boiled in the ordinary manner, the same may be used for other herbs, barks, roots, etc., with great efficiency.

What we claim and desire to secure by Letters Patent is:

In a device of the class described, a casing open at the top, a removable perforated walled holder for the material within the casing out of contact with the side and bottom walls of the casing, a central perforated pipe forming the inner annular wall of the holder concentric with the outer wall of the holder, a perforated steam pipe within the central pipe of the holder passing through the wall of the casing, an annular press-plate in the holder, a cover for the casing, and means for forcing the cover down onto the casing and for forcing the press-plate down into the holder.

In witness whereof we have hereunto set our hands in presence of two witnesses.

FRANCIS SYDNEY DAVIDSON.
WM. POMFRET BURRA.

Witnesses:
W. J. SKERTEN,
J. P. CRAWLEY.